US011223987B2

(12) United States Patent
Larsen et al.

(10) Patent No.: US 11,223,987 B2
(45) Date of Patent: Jan. 11, 2022

(54) BEARER TRANSLATION

(71) Applicant: TELEFONAKTIEBOLAGET LM ERICSSON (PUBL), Stockholm (SE)

(72) Inventors: Åsa Larsen, Hisings Backa (SE); Patrik Dannebro, Hisings Kärra (SE); Lars-Bertil Olsson, Angered (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 679 days.

(21) Appl. No.: 15/760,305

(22) PCT Filed: Feb. 6, 2018

(86) PCT No.: PCT/EP2018/052853
§ 371 (c)(1),
(2) Date: Mar. 15, 2018

(87) PCT Pub. No.: WO2018/146056
PCT Pub. Date: Aug. 16, 2018

(65) Prior Publication Data
US 2020/0267617 A1 Aug. 20, 2020

Related U.S. Application Data

(60) Provisional application No. 62/455,696, filed on Feb. 7, 2017.

(51) Int. Cl.
*H04W 36/14* (2009.01)
*H04L 29/08* (2006.01)
(Continued)

(52) U.S. Cl.
CPC .......... *H04W 36/14* (2013.01); *H04L 69/322* (2013.01); *H04W 28/0268* (2013.01);
(Continued)

(58) Field of Classification Search
CPC . H04W 36/14; H04W 36/30; H04W 36/0033; H04W 36/08; H04W 28/0268;
(Continued)

(56) References Cited

U.S. PATENT DOCUMENTS

2008/0025263 A1* 1/2008 Pelkonen .......... H04W 36/0066
370/332
2011/0310850 A1* 12/2011 Klingenbrunn ....... H04W 36/30
370/332
(Continued)

FOREIGN PATENT DOCUMENTS

| CN | 110622550 A | 12/2019 |
| ES | 2428820 T3 | 11/2013 |
| WO | 2016/175690 A1 | 11/2016 |

OTHER PUBLICATIONS

Kim et al. 3GPP SA2 architeture (Year: 2017).*
(Continued)

*Primary Examiner* — Dady Chery
(74) *Attorney, Agent, or Firm* — Rothwell, Figg, Ernst & Manbeck, P.C.

(57) ABSTRACT

A method for default bearer translation with GBR bearer translation. A GBR bearer is known in UE, 5G-RAN, and SMFs from the existing QoS flow parameters from one or more QoS flows for a PDU session that includes an assigned value for guaranteed bit rate. In case a PDU session has multiple associated QoS flows that each include an assigned value for GBR, then each flow is determined as a candidate GBR bearer for the target E-UTRAN access. Each GBR bearer candidate is arranged in a priority order based on, for example, the QoS flow parameters (e.g., ARP), and the resulting EPS QCI when translating QoS flow parameters in 5G to a 4G representation. Hence common priority rules for 1:1 mapping between 5G representation and 4G representation can be used by the nodes having knowledge of the
(Continued)

PDU session and the QoS flows characterized as GBR QoS flows.

24 Claims, 14 Drawing Sheets

(51) Int. Cl.
    *H04W 28/02*     (2009.01)
    *H04W 28/24*     (2009.01)
    *H04W 36/00*     (2009.01)
    *H04W 36/08*     (2009.01)
    *H04W 36/30*     (2009.01)

(52) U.S. Cl.
    CPC ....... *H04W 28/24* (2013.01); *H04W 36/0022* (2013.01); *H04W 36/0033* (2013.01); *H04W 36/0066* (2013.01); *H04W 36/08* (2013.01); *H04W 36/30* (2013.01)

(58) Field of Classification Search
    CPC ............. H04W 28/24; H04W 36/0066; H04W 36/0022; H04W 36/0027; H04W 36/32; H04L 69/322
    See application file for complete search history.

(56) References Cited

U.S. PATENT DOCUMENTS

| | | | | |
|---|---|---|---|---|
| 2018/0020386 | A1* | 1/2018 | Chandramouli .. | H04W 36/0027 |
| 2019/0182737 | A1* | 6/2019 | Futaki ................. | H04W 36/14 |
| 2019/0182902 | A1* | 6/2019 | Han ...................... | H04W 48/08 |
| 2019/0191348 | A1* | 6/2019 | Futaki ................. | H04W 36/14 |
| 2019/0253938 | A1* | 8/2019 | Sayenko ............ | H04W 36/0069 |
| 2019/0313473 | A1* | 10/2019 | Kim ...................... | H04W 76/25 |
| 2020/0092780 | A1* | 3/2020 | Koshimizu ........... | H04W 36/36 |

OTHER PUBLICATIONS

International Search Report and Written Opinion issued in Application No. PCT/EP2018/052853 dated May 24, 2018, 22 pages.

Ericsson: "Lossless inter-RAT handover with 5GC", 3GPP Draft; R2-1700877; 3GPP TSG-RAN WG2 #97; Athens, Greece, Feb. 13-17, 2017, 4 pages.

Intel Corporation: "Remaining issues on QoS", 3GPP TSG-RAN WG2; R2-1701717 (revision of R2-1700316) Meeting #97; Athens, Greece, Feb. 13-17, 2017, 4 pages.

3GPP, 3rd Generation Partnership Project; Technical Specification Group Services and System Aspects; Procedures on the 5G System; Stage 2, (Release 15), 3GPP TS 23.502, V0.2.0, (Feb. 2017), 71 pages.

3GPP, 3rd Generation Partnership Project; Technical Specification Group Radio Access Network; Study on New Radio Access Technology; Radio Interface Protocol Aspects, (Release 14), 3GPP TR 38.804, V0.5.1, (Feb. 2017), 47 pages.

Catt: "TS 23.502: Discussion on EPS bearer ID allocation during inter-RAT handover from 5GS to EPS", SA WG2 Meeting #120; S2-172175 (revision of S2-17xxxx); Busan, Korea, Mar. 27-31, 2017, 6 pages.

3GPP, 3rd Generation Partnership Project; Technical Specification Group Services and System Aspects; Procedures for the 5G System; Stage 2, (Release 15), 3GPP TS 23.502, V0.1.1, (Jan. 2017), 46 pages.

\* cited by examiner

BEARER TRANSLATION

CROSS REFERENCE TO RELATED APPLICATION(S)

This application is a 35 U.S.C. § 371 National Stage of International Patent Application No. PCT/EP2018/052853, filed Feb. 6, 2018, designating the United States and claiming priority to U.S. provisional application No. 62/455,696, filed on Feb. 7, 2017. The above identified applications are incorporated by this reference.

TECHNICAL FIELD

Disclosed are embodiments for bearer translation.

BACKGROUND

In today's cellular communication networks, mobility is supported so that a user equipment (UE) (i.e., a device capable of wireless communication, such as, for example, a smartphone, a sensor, etc.) can move between cells that support different standards (e.g., 2G/3G and 4G) without the need to re-register with the network (e.g., without the need to perform a network attach procedure). The mobility can be done in connected mode (handover) or in idle mode (access change).

The current $3^{rd}$ Generation Partnership Project (3GPP) network architecture makes mobility straight forward as there is a 1:1 relation between an Evolved Packet System (EPS) bearer in Long Term Evolution (LTE) (a.k.a., 4G) and a Packet Data Protocol (PDP) Context in 3G and 2G. There is also a 1:1 relation between Enhanced Radio Access Bearer (E-RAB) and Data Radio Bearer (DRB) in 4G and between PDP-Context. Radio Access Bearer (RAB) and Radio Bearer (RB) in 2G and 3G where applicable.

At connected mode handover, two or more of the source radio access network (RAN) (e.g., base station, Radio Network Controller (RNC), Base Station Controller (BSC)), the mobility anchor in core network (e.g., SGSN. MME), the UE, and the IP anchor (PDN GW) independently perform a translation from source system representation (e.g., 4G EPS bearer) to target system representation (e.g., 3G PDP-Context) when needed.

SUMMARY

The next generation mobile wireless communication system, which is referred to as "5G." will support a diverse set of use cases and a diverse set of deployment scenarios. 5G will encompass an evolution of today's 4G networks and the addition of a new, globally standardized radio-access technology known as "New Radio" (NR). One drawback of the 5G system is that the mobility solution used between 2G/3G and 4G will not work for mobility between 4G and 5G.

In 5G, the bearer concept/architecture is changed so that: a) a PDN connection realized as multiple EPS bearers in 4G is realized as a single PDU session in 5G; b) QoS characteristics diversified as separate dedicated bearers in 4G are in 5G instead diversified by QoS flows and associated packet marking of user data conveyed via user data tunneling for the PDU session (a QoS flow corresponds to the user plane traffic (within a PDU session) that receives the same QoS treatment); and c) a 4G PDN connection with a use of multiple bearers and thus multiple DRB/E-RAB, may in 5G be multiplexed on the same DRB resource; and d) in 4G there is always an allocated DRB per EPS Bearer when the UE is connected, while in 5G the 5G RAN is free to dynamically allocate DRB resources, thus, in 5G there may be fewer DRBs allocated than active QoS flows.

Hence, there is no guaranteed 1:1 mapping between a 4G EPS representation and a 5G representation, and hence a translation that is done independently by UE. RAN, and core network may lead to different results. Moreover, the value space for EPS Bearer ID and the number of available LTE DRBs do not match the value ranges that are expected to be available in 5G. Further, the UE may not have access to sufficient information needed to translate a representation in 5G to an EPS Bearer context and ID used in 4G.

It is also the case (using legacy EPC procedures) that during an idle mode access change or connected mode handover there is no NAS communication between the UE and source network (5G RAN+5GC), and, therefore, it's not possible to provide the UE with information about a wanted translation result to EPS Bearer contexts. As a consequence, the UE must map 5G resources into 4G resources on its own based on information received before the handover.

To summarize the problems: a) the UE, RAN and Core Network (CN) cannot independently translate between 5G representation and 4G representation and be guaranteed to reach the same result since there is no guaranteed 1:1 mapping and b) 5G representation of related identifiers have a larger value space than the 2G/3G and 4G representations.

The end user impact from a failure to perform a predictable translation can be a dropped call when in a voice-over LTE (VoLTE) conversation, terminated media sessions, starvation of radio resources, as well as longer service interruption during an access change.

This disclose describes embodiments to overcome the above identified problem. For example, this disclosure describes that during an access change from 5G-RAN to E-UTRAN (or 4G-RAN) translation rules are applied to create a predictable set of resulting user plane resources as a selected set of highly prioritized bearers. The selected set of bearers are independently identified and translated by UE, 5G-RAN and 5G core network according to predefined translation rules. Bearers not handed over can be re-initiated by the core network immediately after handover, re-initiated later at a more suitable time, re-initiated later on demand, or alternatively removed. Re-initiation is a decision by core network only and does not require any translation or identification from any other part but introduces an added delay until a QoS diversified communication for application logic with the UE is available again. Re-initiation uses legacy procedures.

For instance, in one aspect there is provided a method for default bearer translation with guaranteed bit rate (GBR) bearer translation. A GBR bearer is known in UE, 5G-RAN, and SMFs from the existing QoS flow parameters from one or more QoS flows for a PDU session that includes an assigned value for guaranteed bit rate. In case a PDU session has multiple associated QoS flows that each include an assigned value for GBR, then each flow is determined as a candidate GBR bearer for the target E-UTRAN access. Each GBR bearer candidate is arranged in a priority order based on, for example, the QoS flow parameters such as Allocation and Retention Priority (ARP), and the resulting EPS QoS Class Identifier (QCI) when translating QoS flow parameters in 5G to a 4G representation. Hence common priority rules for 1:1 mapping between 5G representation and 4G representation can be used by the nodes having knowledge of the PDU session and the QoS flows characterized as GBR QoS flows (or "GBR flows" for short).

In another aspect there is provided a method for default bearer translation with selective bearer translation. A QoS flow intended for handover is marked by 5G core network at initialization as subject for handover. This marking is signaled to 5G-RAN and UE during setup to indicate that the QoS flow is candidate for handover. Each candidate is arranged in priority order based on the QoS flow parameters such as ARP and the resulting EPS QCI when translating QoS flow parameters.

As an alternative signaling solution, the 5G core use new signaling on top the signaling pattern used with the legacy S1-handover signaling in EPC to inform RAN and UE during the handover preparation phase about which resources to consider as prioritized for handover. When 5G core has started to process a requested handover from the source 5G RAN, the 5G core uses N1 signaling to inform the UE about handover prioritization and what EPS bearer ID values to use in signaling in the target 4G access (e.g., Tracking Area Update (TAU) signaling). An advantage with this mechanism is that it makes use of separate signaling and by that does not impact signaling in a 5G system with no support for handover to 4G. Another advantage with this mechanism is that EPS bearer ID values to use in signaling in the target 4G access may be allocated by one of UE, 5G RAN, and 5G core and then distributed to the other two. i.e. it would remove a need for coordinated assignment of EPS bearer ID values by UE, 5G RAN, and 5G core.

Due to 5G core network architecture there may be more than one SMF and policy servers serving a UE. Thus the candidate list for handover may exceed target system capability. In such case bearers may be handed over according to the derived priority order.

In certain embodiments, SMF(s) may be configured to only mark (and signal to UE and 5G-RAN) QoS flows that are dynamically triggered, as subject for handover. Thus ensuring that UE, RAN and NGC all have the same information when deciding which resources to handover, i.e. enable to prioritize QoS flows that are associated with e.g. VoLTE are handed over.

In another aspect there is provided a method for signaling (indication) of which translation method should be used. If only one of the methods above is selected, both UE and network knows which method to use (and which QoS flows to hand over). If more than one translation method is supported the core network signals to the UE and RAN which method to apply. If the methods are introduced at different times, the UE may need to indicate which methods it supports to the core network.

In another aspect there is provided a method for handover from a 5G radio access network, 5G-RAN, to a 4G-RAN. The method includes assigning a first bearer identifier, ID, to at least a first QoS flow for the UE. The method also includes assigning a second bearer ID to at least a second QoS flow for the UE. The method further includes generating a handover message and transmitting the handover message, wherein generating the handover message comprises including the first and second bearer IDs in the handover message.

In some embodiments, the method further includes selecting a translation method for mapping 5G quality-of-service, QoS, flows for a user equipment, UE, to 4G bearers.

In some embodiments, the method is performed by the 5G-RAN.

In some embodiments, selecting the translation method comprises selecting a translation method that matches a translation method selected by a 5G core network node, CN. In some embodiments, selecting a translation method that matches a translation method selected by the 5G CN comprises determining the translation method selected by the 5G CN by receiving from the 5G CN a message identifying the translation method selected by the 5G CN.

In some embodiments, generating the handover message comprises generating a transparent container for the 4G-RAN, and the first and second bearer IDs are E-RAB IDs that are included in an E-RABs Information Lists Information Element, IE, of the transparent container. In some embodiments, the handover message further comprises: the first bearer ID and at least a first QoS flow ID that identifies the first QoS flow to which the first bearer ID is assigned, and the second bearer ID and at least a second QoS flow ID that identifies the second QoS flow to which the second bearer ID is assigned.

In some embodiments, the first QoS flow is a default QoS flow, and the second QoS flow is a guaranteed bit rate, GBR, QoS flow.

In some embodiments, the method further comprises creating an ordered set of guaranteed bit rate, GBR, QoS flows prior to performing the assigning steps, wherein the ordered set of GBR QoS flows comprises a first GBR QoS flow being the first GBR QoS flow in the ordered set and a second GBR QoS flow being the second GBR QoS flow in the ordered set, the first QoS flow is a default QoS flow, and the second QoS flow is the first GBR QoS flow.

In another aspect there is provided a network node being adapted to perform the method.

In another aspect there is provided a method performed by a user equipment, UE, capable of communicating with a 5G-RAN and a 4G-RAN. The method includes the UE assigning a first bearer identifier, ID, to a first QoS flow for the UE; and the UE assigning a second bearer ID to a second QoS flow for the UE.

In some embodiments, the method further includes the UE selecting a translation method for mapping 5G quality-of-service, QoS, flows for the UE to 4G bearers.

In some embodiments, selecting the translation method comprises selecting a translation method to match a translation method selected by a 5G core network node, CN. In some embodiments, selecting a translation method that matches a translation method selected by the 5G CN comprises determining the translation method selected by the 5G CN by receiving from the 5G CN a message identifying the translation method selected by the 5G CN.

In some embodiments, the method further includes the UE transmitting a registration request message comprising information identifying a set of one or more translation methods for mapping 5G QoS flows to 4G bearers that are supported by the UE. In some embodiments, the registration request message is one of: i) a Non-Access Stratum (NAS) Registration Request and ii) a NAS Tracking Area Update Request.

In another aspect there is provided a UE being adapted to perform the method.

In another aspect there is provided a method a tracking area update, TAU, method, wherein the method is performed by a first core network node, CN. The method includes receiving a Context Request transmitted by a second core network node, wherein the second core network node transmitted the Context Response after receiving a TAU request pertaining to a UE. The method also includes assigning a first bearer identifier, ID, to a first QoS flow for the UE; assigning a second bearer ID to a second QoS flow for the UE; generating a Context Response; and transmitting the Context Response, wherein generating the Context Response comprises including the first and second bearer IDs in the Context Response. In another aspect there is provided a core network node being adapted to perform the method.

In another aspect there is provided a tracking area update, TAU, method, wherein the method is performed by a UE. The method includes the UE making a decision to send a TAU request. The method also includes the UE assigning a first bearer identifier, ID, to a first QoS flow for the UE and assigning a second bearer ID to a second QoS flow for the UE. The method further includes the UE generating the TAU request and transmitting the TAU request, wherein generating the TAU request comprises including in the TAU request information identifying that the first bearer ID is assigned to a QoS flow and the second bearer ID is assigned to a QoS Flow. In some embodiments, including in the TAU request information identifying that the first bearer ID is assigned to a QoS flow and the second bearer ID is assigned to a QoS Flow comprises including in the TAU request an EPS bearer context status IE that indicates that the bearers corresponding to the first and second bearer IDs are not inactive. In another aspect there is provided a UE being adapted to perform the TAU method.

In another aspect there is provided a method for mapping quality of service, QoS, flows to bearer identifiers. The method includes receiving, at a 5G core network node, 5G-CN, a session establishment request; and after receiving the session establishment request, the 5G-CN transmitting to a 5G radio access network, 5G-RAN, a session request, wherein the session request comprises i) information identifying a set of QoS flows and ii) subject for handover information indicating which of the identified QoS flows are subject for handover. In some embodiments, the session request comprises a QoS profile, and the subject for handover information is part of the QoS profile.

Advantages

End user quality will improve when changing access from 5G to 4G. The end user quality at handover is important for, among other things, voice-over LTE (VoLTE) over 5G when there is no homogenous 5G coverage and the UE needs to perform mobility to 4G when out of 5G coverage. With embodiments disclosed here, the UE is provided with GBR bearer for VoLTE/IMS media transport, as part of the handover execution and by that minimizes service interruption caused by the access change.

Also, the UE is automatically provided with GBR bearer resources at an access change 5G to 4G in idle mode. The effect of the IRAT TAU procedure with Active flag is service continuity of an ongoing voice call but with a longer service interruption in comparison at a use of access change using handover.

Another advantage is that it's transparent to EPC.

Another advantage is that a subset of user plane resources in the 5G access, which can be detected and which are essential for service continuity, are preserved and remains available also after an access change. Resources that are not possible to identify and associate to an application function, are implicitly removed during the access change. The network may choose to re-activate such resources based on service need.

Another advantage is that there is no risk for misalignment of the representation in the NW and the UE in that case.

Also, limiting the scope to the default flow and GBR flows combined with the legacy option of subsequent reactivation of dynamic flows/last active flows and on-demand setup upon service detection, gives a robust and sufficient combination from that it gives a predictable translation result.

BRIEF DESCRIPTION OF THE DRAWINGS

The accompanying drawings, which are incorporated herein and form part of the specification, illustrate various embodiments.

DETAILED DESCRIPTION

Figure 1:
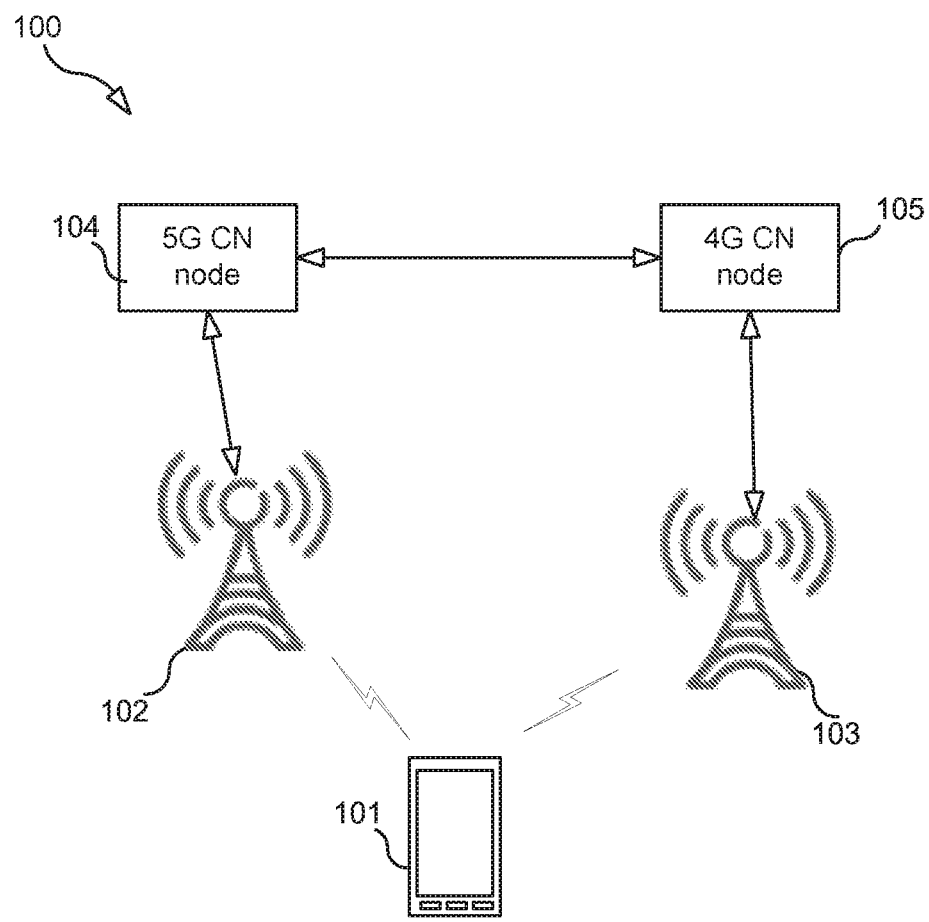
FIG. 1 illustrates a system according to some embodiments.

FIG. 1 illustrates a system 100 according to some embodiments. System 100 shows a UE 101 being handed over from a 5G-RAN 102 to a 4G-RAN 103. 5G-RAN 102 communicates with a 5G core network (CN) node (e.g., a mobility management node) and 4G-RAN 103 communicates with a 4G CN node (e.g., a mobility management node, such as Mobility Management Entity (MME)).

Figure 2:
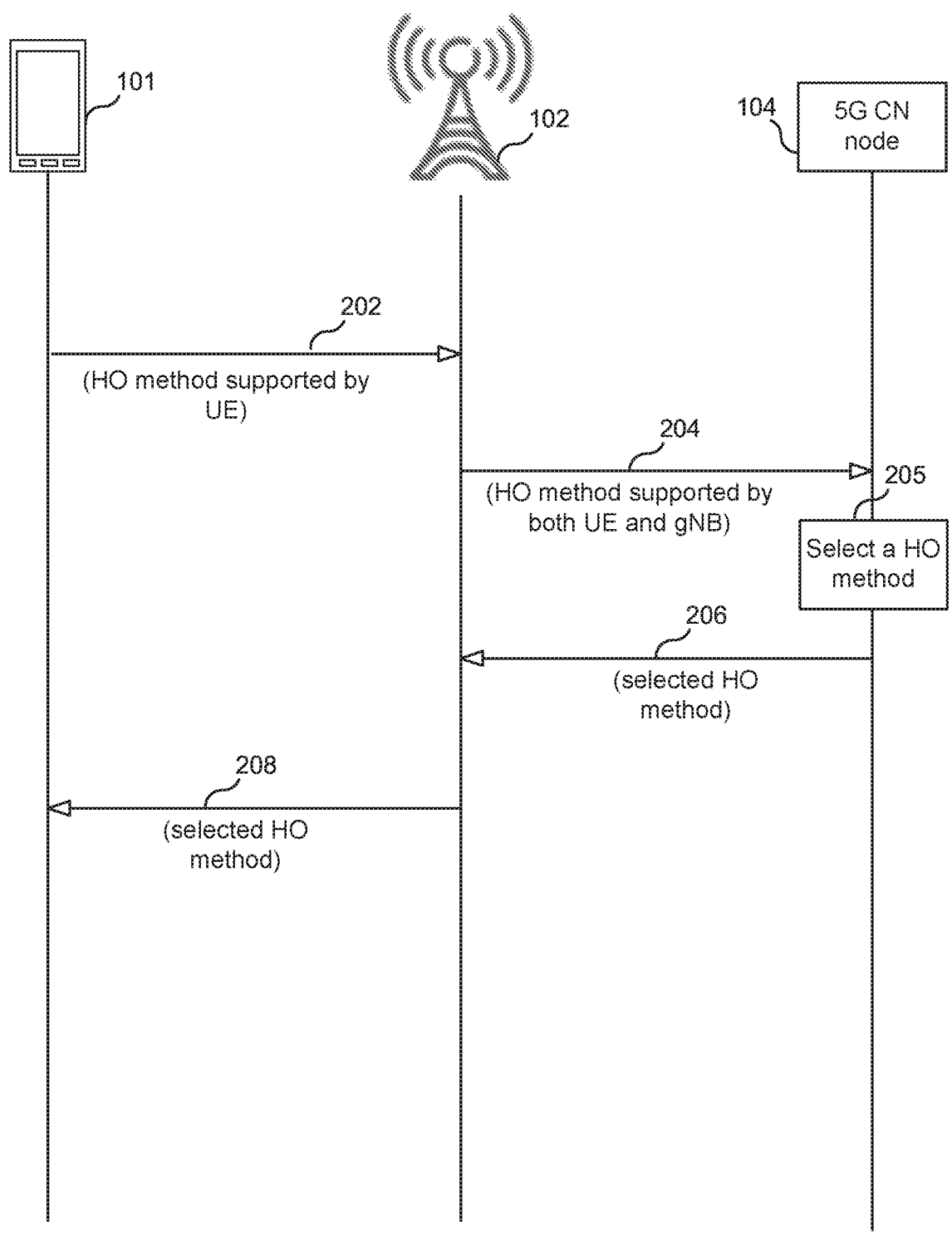
FIG. 2 is a message flow diagram illustrating a process according to one embodiment.

FIG. 2 is a message flow diagram illustrating a process according to one embodiment. In step 202, UE 101 transmits a message to 5G-RAN 102 (e.g., a gNB of 5G-RAN 102). The message includes information identifying the methods for translation and selection of user plane resources (or "translation methods" for short) the UE 101 supports. In some embodiments. UE 101 may support one or more of the following translation methods: 1) default bearer Only translation; 2) default plus GBR Bearer translation; and 3) Selective Bearer translation. A special case of Selective Bearer translation is when all QoS flows are selected. In some embodiments, the message transmitted by UE 101 in step 202 is transmitted as part of a registration process for registering UE 101 with 5G CN node 104. Accordingly, the message transmitted in step 202 may be a 5G registration request message (i.e., the NAS Registration Request message), which is similar to a 4G Attach Request message and 4G Tracking Area Update (TAU) Request message. In other embodiments, the message transmitted in step 202 may be the NAS TAU Request message.

In step 204, 5G-RAN 102 transmit to node 104 a message comprising information indicating the translation methods that UE 101 supports and the translation methods that 5G-RAN 102 supports. In other embodiments, the message transmitted in step 204 identifies only those translation methods that are supported by both UE 101 and 5G-RAN 102 (i.e. 5G-RAN evaluates the common denominator and indicates this to node 104). In some embodiments, 5G-RAN 102 performs step 204 in response to receiving the message transmitted by UE 101 in step 202.

In step 205, node 104 receives the message transmitted by 5G-RAN 102 in step 204 and then selects one of the translation methods identified in the message.

In step 206, node 104 transmits to 5G-RAN 102 a message comprising information identifying the selected translation method.

In step 208, 5G-RAN 102 receives the message transmitted by node 104 in step 206 and, in response, transmits to UE 101 a message comprising the information identifying the selected translation method, which selected translation method is to be used by UE 101 and by 5G-RAN 102 and 5G CN node 104 for UE 101. Accordingly, in some embodiments, 5G-RAN 102 evaluates the message transmitted by node 104 to determine the selected translation method and stores an identifier identifying the selected translation method (e.g., the identifier may be added to UE context information maintained by 5G-RAN 102). In some embodiments, the message transmitted in step 208 is a registration response message, which may be similar to the 4G Attach Accept message and the 4G TAU Accept message.

Figure 3:
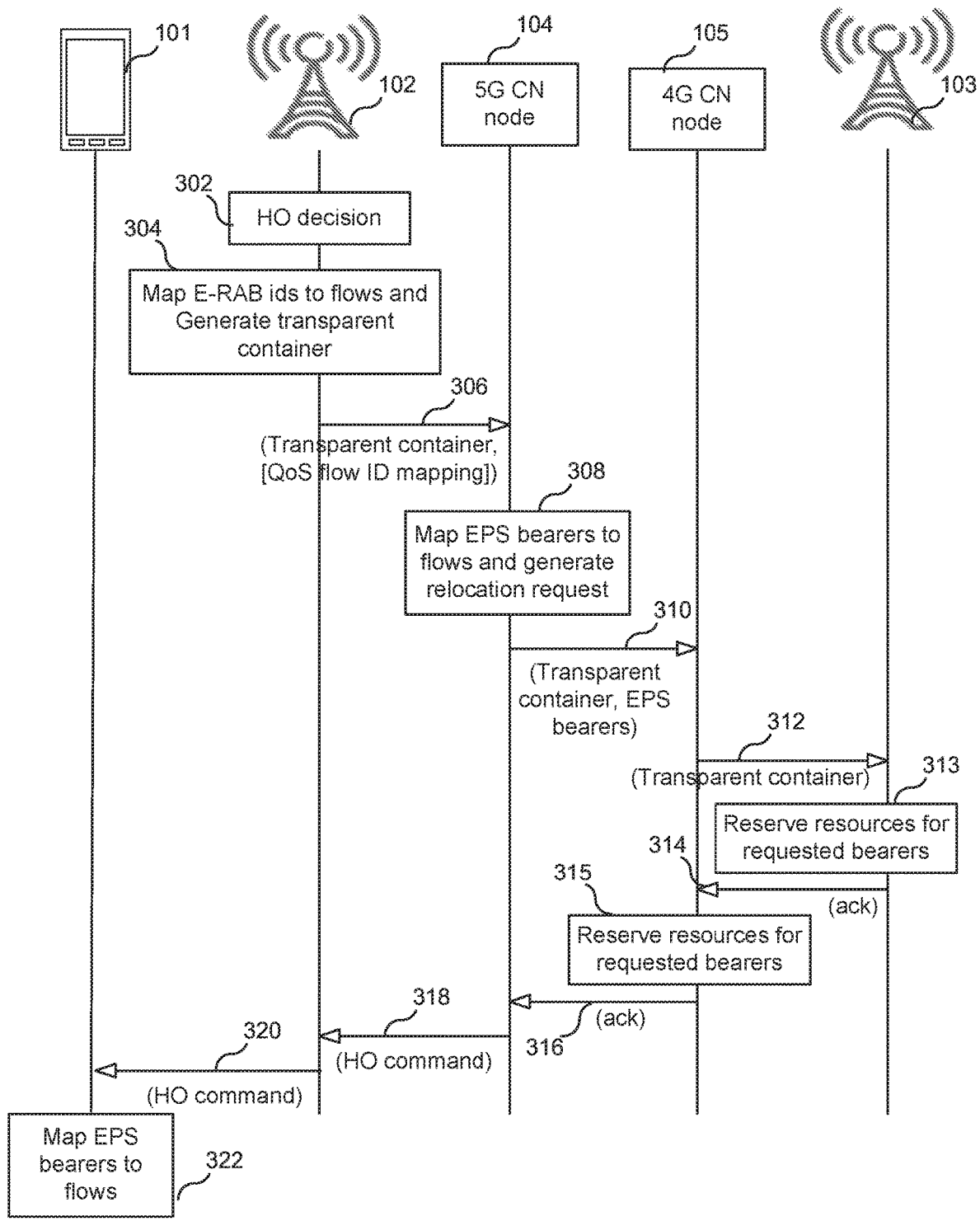
FIG. 3 is a message flow diagram illustrating a process according to one embodiment.

FIG. 3 is a message flow diagram illustrating a process, according to some embodiments, for performing a default bearer+GBR bearer translation.

The process begins in step 302, in which 5G-RAN 102 determines that UE 101 should be handed-over to 4G-RAN 103.

In step 304, 5G-RAN 102 identifies the default QoS flow and GBR QoS flows per PDU session based on associated QoS characteristics. 5G-RAN 102 then uses a predetermined translation rule to assign (map) an E-RAB identifier (ID) (EPS bearer ID) to one or more of the identified QoS flows (e.g., a first E-RAB ID may be assigned to the default QoS flow and other E-RAB IDs are assigned to the GBR QoS flows). The E-RAB IDs are then included in a transparent container generated by 5G-RAN 102. For example, 5G-RAN 102 may sort the flows in priority order according to a predefined rule. This priority order is used to populate a transparent container that is generated by 5G-RAN 102 and sent to 4G-RAN 103. The transparent container generated and sent by 5G-RAN 102 may be the "Transparent Container IE" defined in 3GPP TS 36.413 v14.1.0.

For example, in step 304, after ordering the flows, thereby creating an ordered set of GBR flows, 5G-RAN 102 assigns to each one of the top N GBR flows (e.g., N<5) an E-RAB ID. For instance, the first GBR flow in the ordered set of GBR flows is assigned E-RAB IDn+1, the second GBR flow in the ordered set of GBR flows is assigned E-RAB IDn+2, the third GBR flow in the ordered set of GBR flows is assigned E-RAB IDn+3, etc. Additionally, E-RAB IDn is assigned to the default QoS flow. The assigned E-RAB IDs (i.e., E-RAB IDn, E-RAB IDn+1. E-RAB IDn+2, . . . ) are included in an E-RAB list that is part of the transparent container.

In step 306, 5G-RAN 102 transmits to node 104 the transparent container. For example, in step 306, 5G-RAN 102 may transmit to node 104 a message that comprises the transparent container (this message is referred to herein as the "handover required" message). In some embodiments, in addition to including the transparent container in the handover required message, the 5G-RAN 102 also includes in the handover required message information showing how 5G-RAN 102 assigned E-RAB IDs to the QoS Flows. For instance, in addition to the transparent container, the handover required message may include separate from the transparent container a list of pairs (e.g., a set of tuples), where each pair consists essentially of an EPS bearer ID and a QoS flow identifier identifying the QoS flow to which the paired EPS bearer ID was assigned. As is known in the art, there is a 1:1 mapping between E-RAB IDs and EPS bearer IDs.

In step 308, node 104 receives the message transmitted by 5G-RAN 102 in step 306 and, in response, identifies the default QoS flow and GBR QoS flows per PDU session based on associated QoS characteristics. Node 104 then uses the predetermined translation rule to assign an EPS bearer identifier (ID) to one or more of the identified QoS flows (e.g., a first EPS bearer ID may be assigned to the default QoS flow and other EPS bearer IDs are assigned to the GBR QoS flows). The assigned EPS bearer IDs are then included in a handover message generated by node 104. For example, node 104 may sort the QoS flows in priority order according to the predefined rule. This priority order is used to populate a handover message that is generated by node 104 and sent to node 105. The handover message generated in step 308 also includes the received transparent container. In some embodiments, the handover message is a Forward Relocation Request message.

For example, in step 308, after ordering the flows node 104 assigns to each one of the top N GBR flows (e.g., N<5) an EPS bearer ID. For instance, the first GBR flow in the ordered set of GBR flows is assigned EPS bearer IDn+1, the second GBR flow in the ordered set of GBR flows is assigned EPS bearer IDn+2, the third GBR flow in the ordered set of GBR flows is assigned EPS bearer IDn+3, etc. Additionally, EPS bearer IDn is assigned to the default QoS flow. The assigned EPS bearer IDs (i.e., EPS bearer IDn, EPS bearer IDn+1, EPS bearer IDn+2, . . . ) are included in handover message together with the transparent container.

In embodiments in which the handover required message transmitted in step 306 by 5G-RAN 102 includes not only the transparent container, but also the EPS bearer ID-QoS Flow ID pairs described above, then in step 308 node 104 simply includes the EPS bearer IDs identified in the handover required message in the handover message that node 104 transmits to node 105. As discussed above, the handover message generated in step 308 and transmitted by node 104 to node 105 may be a Forward Relocation Request message defined in 3GPP TS 36.413. Thus, the Forward Relocation Request generated by node 104 includes a bearer context IE for each EPS bearer ID—QoS flow ID pair identified in the handover required message received from 5G-RAN 102. Thus, each bearer context IE will correspond to one of the identified QoS flows. The bearer context IE corresponding to a QoS flow includes one or more bearer level QoS parameters (e.g., QCI, ARP, GBR, Maximum Bit Rate (MBR)) corresponding to the QoS parameters for the QoS flow.

In step 310, 5G node 104 transmits the generated handover message to 4G node 105.

In step 312, node 105 transmits to 4G-RAN 103 a message (i.e., a Handover Request) comprising the transparent container node 105 received from node 104.

In step 313, 4G-RAN 103 receives the Handover Request, reserves resources for the requested bearers (i.e., the bearers identified by the E-RAB IDs included in the transparent container), and generates and acknowledgment (ACK) (e.g., the S1AP message Handover Request Acknowledge).

In step 314, 4G-RAN 103 transmits the ACK to node 105.

In step 315, node 105 receives the ACK (e.g. a Handover Request Acknowledge) transmitted by 4G-RAN 103, reserves resources for the requested bearers (i.e., the bearers identified in the message received from 5G node 104), and generates and acknowledgment (ACK).

In step 316, node 105 transmits a response message (e.g., a Forward Relocation Response) to node 104.

In step 318, in response to receiving the response message transmitted by node 105, node 104 transmits a handover command to 5G-RAN 102.

In step 320, 5G-RAN 102 receives the hand over command and then sends a handover command to UE 101.

In some embodiments, the handover command sent to UE 101 includes information showing how the 5G network (i.e., 5G-RAN 102 or 5G CN node 104) assigned E-EPS bearer IDs to the QoS flows. For instance, the handover command may include a list of pairs (e.g., a set of tuples), where each pair consists essentially of an EPS bearer ID and a QoS flow identifier identifying the QoS flow to which the paired EPS bearer ID was assigned. Either one of node 102 and node 104 may include the list of pairs in the handover command. In other embodiments, another message is used to convey to UE 101 the information showing how the 5G network (i.e., 5G-RAN 102 or 5G CN node 104) assigned E-EPS bearer IDs to the QoS flows. For example, in some embodiments, this other message (e.g., a new NAS message) may be transmitted by one of RAN 102 or CN 104 after step 306 is performed and before sent 320 is performed.

In step 322, UE 101 identifies the default QoS flow and GBR QoS flows per PDU session based on associated QoS characteristics. It sorts the flows in priority order. This priority order is used to derive the EPS bearer representation the UE uses in 4G. For example, UE 101 uses the predetermined translation rule to assign an EPS bearer ID to one or more of the identified QoS flows (e.g., a first EPS bearer ID may be assigned to the default QoS flow and other EPS bearer IDs are assigned to the GBR QoS flows). For example, UE 101 may sort the QoS flows in priority order according to the predefined rule and then assign EPS bearer IDs to the flows. As a more specific example, in step 322, after ordering the flows UE 101 assigns to each one of the top N GBR flows (e.g., N<5) an EPS bearer ID. For instance, the first GBR flow in the ordered set of GBR flows is assigned EPS bearer IDn+1, the second GBR flow in the ordered set of GBR flows is assigned EPS bearer IDn+2, the third GBR flow in the ordered set of GBR flows is assigned EPS bearer IDn+3, etc. Additionally, EPS bearer IDn is assigned to the default QoS flow. This is repeated for each PDU session (UE 101 may be using multiple PDU sessions, each associated with one or more QoS flows).

In embodiments in which a message is transmitted to UE 101 that includes the EPS bearer ID-QoS flow ID pairs (e.g., the handover command or some other message as described above), then in step 322 node 104 simply adopts the identified EPS bearer ID-QoS flow ID pairings—i.e., for each listed pair, UE 101 uses the EPS bearer identified by the EPS bearer ID included in the pair when transmitting data for the QoS flow identified by the QoS flow ID included in the pair.

As demonstrated above, by having UE 101, 5G-RAN 102 and 5G CN 104 each use the same rules to for assigning E-RAB IDs (EPS bearer IDs) to 5G QoS flows, UE 101, 4G-RAN 103 and 4G CN 105 will all have common setup of EPS bearers derived from the 5G QoS flows.

Figure 4:
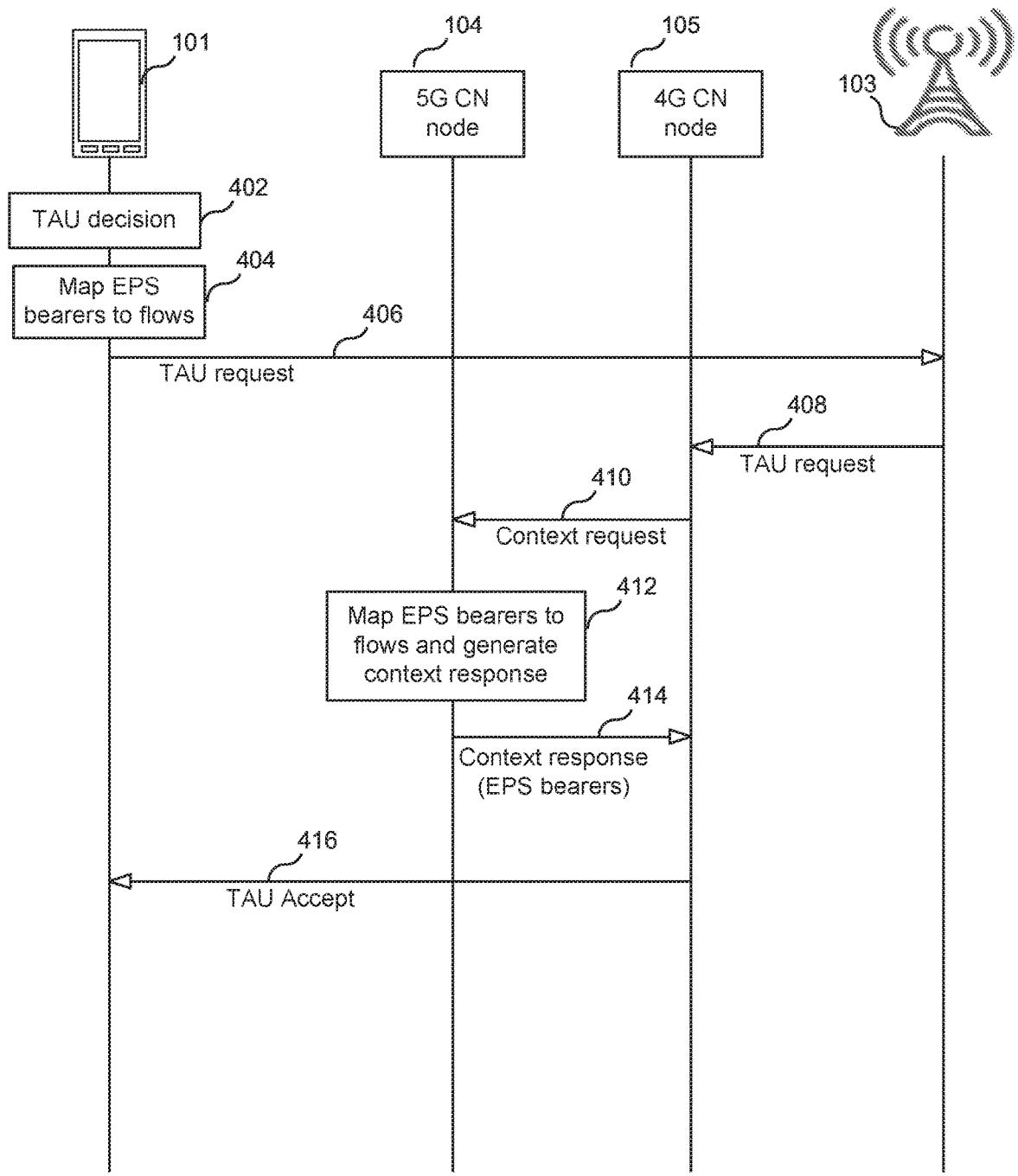
FIG. 4 is a message flow diagram illustrating a process according to one embodiment

FIG. 4 is a message flow diagram illustrating a process, according to some embodiments, for performing a Tracking Area Update (TAU) procedure.

In step 402, UE 101 determines that it should initiate the TAU procedure.

In step 404, UE 101 derives EPS bearers based on the translation method selected (see FIG. 2). For example, in the event that the selected translation method is default plus GBR bearer, then in step 404 UE 101 performs the same steps as described above with respect to step 322. For instance, UE 101 adopts EPS bearer ID-QoS flow ID pairings that were communicated to UE 101 or itself assigns EPS bearer IDs to one more of its QoS flows as described above.

In step 406, UE 101 transmits a TAU request to 4G-RAN 103. The TAU requests includes information identifying the EPS bearer IDs that are assigned to a QoS flow. For instance, assuming that in step 404 UE 101 assigned EPS bearer ID1 to a first QoS Flow, EPS bearer ID2 to a second QoS flow, and EPS bearer ID3 to a third QoS flow, then the EPS bearer context status IE of the TAU message will indicate that the EPS bearers corresponding to these three EPS bearer IDs are not inactive, but all of the other possible EPS bearers are inactive.

In step 408, 4G-RAN 103, in response to the TAU request from UE 101, transmits a TAU request to node 105.

In step 410, node 105, in response to the TAU request from 4G-RAN 103, transmits a Context Request to node 104 requesting context information for UE 101.

In step 412, node 104 receives the Context Request and in response generates a Context Response. Generating the context response includes node 104 deriving EPS bearers from the flows associated with the PDU session based on the translation method selected and populating the Context Response with information identifying the derived EPS bearers. That is, in step 412 node 104 assigns EPS bearer IDs to QoS flows in a similar manner as described with respect to step 308. The way EPS bearer IDs are assigned at an idle mode change may be different compared to at handover. At handover 5G RAN assigns EPS bearer ID values to a QoS flows in use. At idle mode change there is no 5G RAN involved. At an idle mode change the UE 101 and 5G CN 104 independently assigns EPS bearer IDs based on translation method selected and predefined rules of how to allocate EPS bearer ID values.

In step 414, node 104 transmits the Context Response to node 105.

In step 416, node 105, in response to receiving the Context Response, transmits to UE 101 a TAU accept.

Figure 5A:
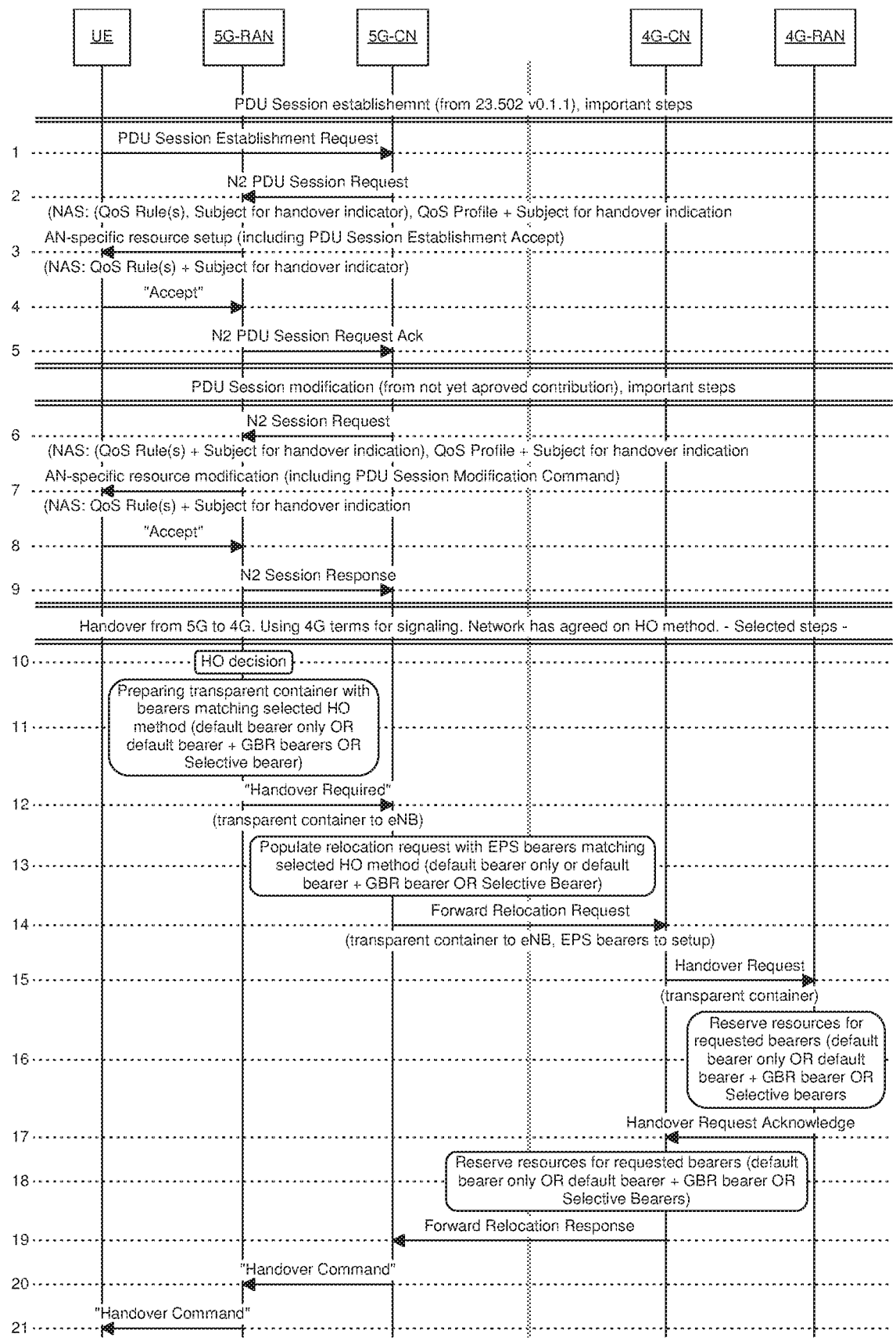
FIGS. 5A and 5B is a message flow diagram illustrating a process according to one embodiment.
Figure 5B:
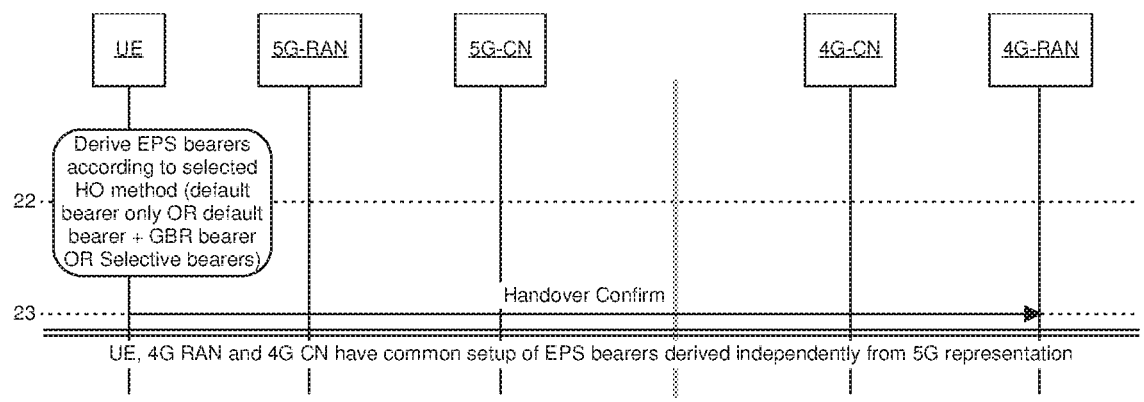

FIGS. 5A and 5B show a message flow diagram illustrating a process, according to some embodiments, for performing a default bearer+Selected bearer translation. The process is broken into three parts: Part 1 (steps 1-5); Part 2 (steps 6-9); and Part 3 (steps 10-23).

Part 1: PDU Session Establishment, UE Initialize a PDU Session

Step 1: UE 101 initiates PDU session establishment procedure by sending NAS message (e.g., PDU Session Establishment Request) to node 104 via 5G-RAN 102.

Step 2: 5G CN 104 sends a N2 PDU Session Request to 5G-RAN 102, which request includes N2 information including a QoS Profile that is used by RAN 102 to map between QoS parameters and QoS Flow Identifiers. The QoS Profile also includes information informing RAN which QoS flows that shall be subject for handover. This information may be referred to as a "Subject for handover indication." The N2 PDU Session Request also includes a NAS message (e.g., PDU Session Establishment Accept) for the UE.

Step 3: 5G-RAN 102 sets up the required radio resources and forwards the NAS message (PDU Session Establishment Accept) received in step 2 to UE 101. The NAS message includes QoS Rules and mapping with QoS Flow identifiers. For example, the mapping information includes one or more QoS flow IDs, and, for each QoS flow ID the mapping information includes QoS parameters (e.g., GBR) for the flow identified by the QoS flow ID and a packet flow marker for the flow identified by the QoS flow ID (the packet flow marker is included in packets sent to the UE so that the UE can determine the QoS flow to which the packet belongs in case one DRB resource is used to multiplex multiple QoS flows). The QoS Rules also includes a "Subject for handover indication" informing UE 101 as to which QoS flows shall be subject for handover.

Step 4: UE 101 receives the NAS message transmitted by node 102 and sends an ACK (e.g., an Accept).

Step 5: In response to receiving the ACK transmitted by UE 101, RAN node 102 sends an ACK to CN 104.

When part 1 is completed UE 101, 5G-RAN 102 and 5G-CN 104 all have information (e.g., a list) identifying the QoS flows that are subject for handover.

Part 2: PDU Session Modification (Optional)

In part 2, the PDU session is modified for some reason. New QoS rules may be added, previously installed QoS rules may need to be marked as "Subject for handover", QoS rules are deleted etc.

The steps of part 2 (steps 6-9) are essentially the same as step 2-5 above.

In step 6, 5G CN 104 sends a N2 PDU Session Request to 5G-RAN 102, which request includes N2 information including a QoS Profile that is used by RAN 102 to map between QoS parameters and QoS Flow Identifiers. The QoS Profile also includes information informing RAN as to which QoS flows shall be subject for handover. For example, the QoS Profile includes information as to whether a 5G PDU session can be used/referred to by a 4G MME after an access change from 5G to 4G. If the PDU session cannot be used, the PDU session will fail during handover and, for that reason, the PDU session should be excluded from start and should not be considered for handover or reestablishment in the 4G access. The N2 PDU Session Request also includes a NAS message (e.g., PDU Session Establishment Accept) for the UE that also includes information for informing the UE as to which QoS flows shall be subject for handover.

In step 7, 5G-RAN 102 sets up the required radio resources and forwards the NAS message (PDU Session Establishment Accept) received in step 6 to UE 101. The NAS message includes QoS Rules and mapping with QoS Flow identifiers. The QoS Rules also includes a "Subject for handover indication" informing UE 101 as to which QoS flows shall be subject for handover.

In step 8, UE 101 receives the NAS message transmitted by node 102 and sends an ACK (e.g., an Accept).

In step 9, In response to receiving the ACK transmitted by UE 101. RAN node 102 sends an ACK to CN 104.

When part 1 is completed UE 101, 5G-RAN 102 and 5G-CN 104 all have an updated list of which QoS flows that are subject for handover.

Part 3 Handover from 5G to 4G

In part 3, UE 101, 5G-RAN 102 and 5G-CN 104 have decided on the Selective Bearer translation method. It is possible that there may be more QoS flows marked as "Subject for handover" than what is possible to actually send to 4G.

Step 10: 5G-RAN 102 decides to perform handover of UE 101 to 4G-RAN 103.

Step 11: 5G-RAN 102 generates the transparent container that is to be sent to 4G-RAN 103. In generating the transparent container, 5G-RAN 102 assigns an E-RAB ID to each QoS flow that is marked as Subject for handover unless the number of QoS flows that are marked Subject for handover exceeds a threshold (e.g., the threshold may be the number of EPS bearers that the 4G network can handle). In the event that the number of QoS flows that are marked Subject for handover exceeds the threshold, 5G-RAN 102 orders the QoS flows that are marked as Subject for handover (e.g., in priority order) and, for each one of the top N flows (i.e., the N flows with highest priority) (N=8 in one embodiment), 5G-RAN 102 assigns an E-RAB ID to the QoS flow. Thus, at most N E-RAB IDs are assigned a QoS flow. Each E-RAB ID that is assigned to a QoS flow is put in the transparent container in the E-RABs Information List IE.

Step 12: 5G-RAN 102 sends to 5G-CN 104 a handover message that includes the transparent container. The handover message is the 5G version of the 4G "Handover Command."

Step 13: Upon reception of the handover message, 5G-CN 104 generates a Forward Relocation Request (FRR) message. In generating the FRR, 5G CN 104 assigns an EPS bearer ID to each QoS flow that is marked as Subject for handover unless the number of QoS flows that are marked Subject for handover exceeds a threshold (e.g., the threshold may be the number of EPS bearers that the 4G network can handle). In the event that the number of QoS flows that are marked Subject for handover exceeds the threshold, 5G CN 104 orders the QoS flows that are marked as Subject for handover (e.g., in priority order) and, for each one of the top N flows (i.e., the N flows with highest priority) (N=8 in one embodiment), 5G CN 104 assigns an EPS bearer ID to the QoS flow. Thus, at most N EPS bearer IDs are assigned a QoS flow. Each EPS bearer ID that is assigned to a QoS flow is put in the FRR. More specifically, the FRR generated by node 104 includes a bearer context IE for each EPS bearer ID that is assigned to a QoS Flow. Thus, each bearer context IE will correspond to one of the QoS flows to which an EPS bearer ID was assigned. The bearer context IE corresponding to a QoS flow includes one or more bearer level QoS parameters (e.g., QCI. ARP, GBR. Maximum Bit Rate (MBR)) corresponding to the QoS parameters for the QoS flow.

Step 14: 5G-CN 104 sends the FRR message to 4G-CN 105. The message contains the transparent container received in step 12 and the EPS-bearers derived in step 13.

Step 15-19: According to legacy procedures in EPS.

Step 20: 5G-RAN 102 orders 5G-RAN 102 to start with HO.

Step 21: 5G-RAN 102 orders UE 101 to start with HO.

Step 22: UE 101 start to derive a 4G representation (bearers and DRB) of the 5G representation it has. That is, in step 22, UE 101 uses the "Selective bearer" method to select all QoS flows marked as Subject for handover. Since there may be more flows than what is possible to send, it orders them in priority order. Those 8 flows with highest priority is selected and gets an EPS bearer ID according to the priority.

Step 23: UE confirm the handover when appearing in 4G.

Referring back to FIG. 4, if the selected translation method is the Selective Bearer translation method, then in step 404 UE 101 generates the TAU request, wherein generating the TAU request comprises UE 101 assigning an EPS bearer ID to each QoS flow that is marked as Subject for handover unless the number of QoS flows that are marked Subject for handover exceeds the threshold. In the event that the number of QoS flows that are marked Subject for handover exceeds the threshold, UE 101 orders the QoS flows that are marked as Subject for handover (e.g., in priority order) and, for each one of the top N flows (i.e., the N flows with highest priority), UE 101 assigns an EPS bearer ID to the QoS flow. The generated TAU request includes information identifying the EPS bearer IDs that have been assigned to a QoS flow. For instance, assuming that in step 404 UE 101 assigned EPS bearer ID1 to a first QoS Flow, EPS bearer ID2 to a second QoS flow, and EPS bearer ID3 to a third QoS flow, then the EPS bearer context status IE of the TAU message will indicate that the EPS bearers corresponding to these three EPS bearer IDs are not inactive, but all of the other possible EPS bearers are inactive.

Similarly, referring back to step 412 of FIG. 4, when the selected translation method is Selective bearer translation method, then in step 412 5G CN 104 generates the Context Response, wherein generating the Context Response comprises 5G CN 104 assigning an EPS bearer ID to each QoS flow that is marked as Subject for handover unless the number of QoS flows that are marked Subject for handover exceeds the threshold. In the event that the number of QoS flows that are marked Subject for handover exceeds the threshold. 5G CN 104 orders the QoS flows that are marked as Subject for handover (e.g., in priority order) and, for each one of the top N flows (i.e., the N flows with highest priority), 5G CN 104 assigns an EPS bearer ID to the QoS flow. Each EPS bearer ID that is assigned to a QoS flow is put in the Context Response. More specifically, the Context Response generated by node 104 includes a bearer context IE for each EPS bearer ID that is assigned to a QoS Flow. Thus, each bearer context IE will correspond to one of the QoS flows to which an EPS bearer ID was assigned. The bearer context IE corresponding to a QoS flow includes one or more bearer level QoS parameters (e.g., QCI. ARP, GBR, Maximum Bit Rate (MBR)) corresponding to the QoS parameters for the QoS flow.

Figure 6:
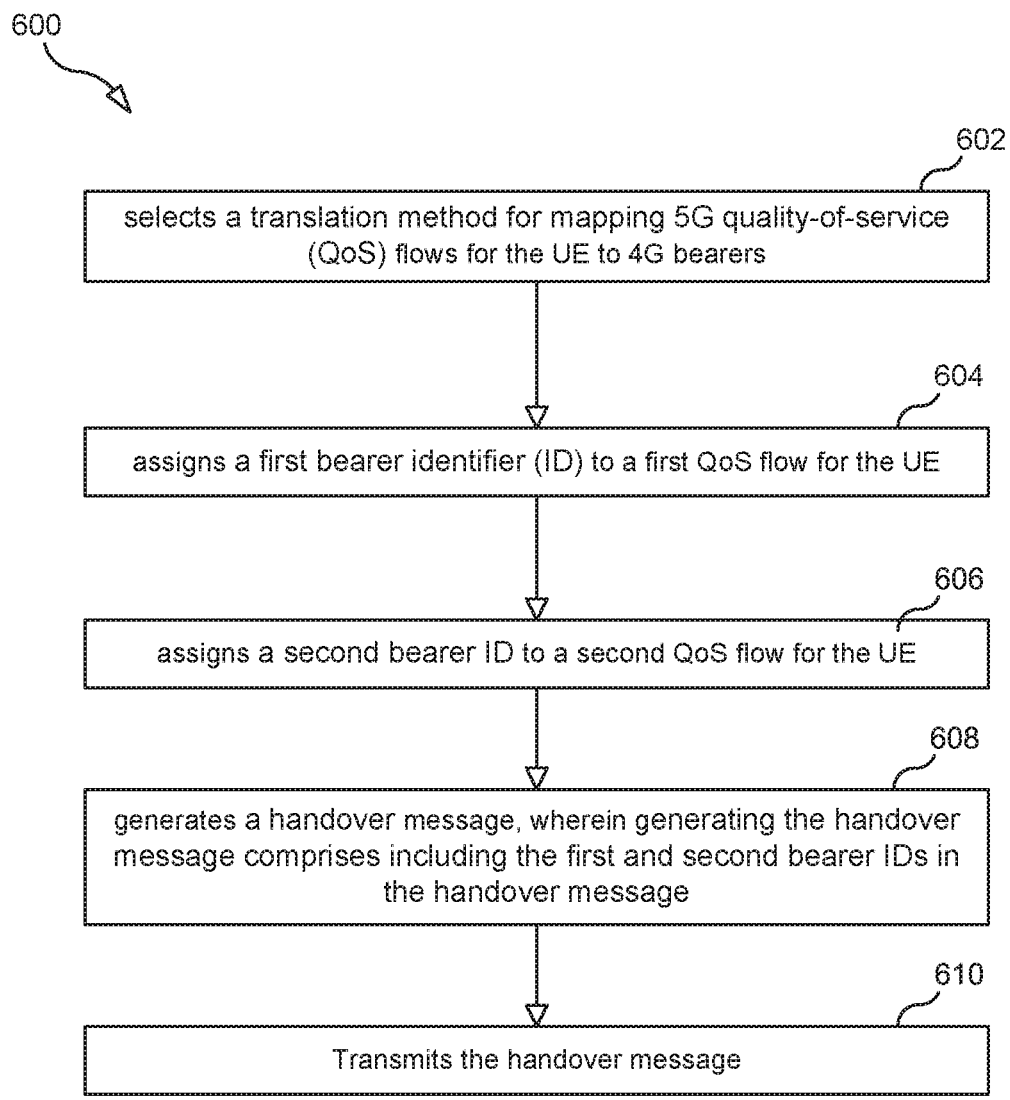
FIG. 6 is a flow chart illustrating a process according to some embodiments.

FIG. 6 is a flow chart illustrating a process 600 according to some embodiments. Process 600 may begin in step 602 in which a 5G network node (5G-RAN 102 or 5G CN 104) selects a translation method for mapping 5G quality-of-service (QoS) flows for the UE to 4G bearers. In step 604, the network node assigns a first bearer identifier (ID) to a first QoS flow for the UE. In step 606, the network node assigns a second bearer ID to a second QoS flow for the UE. In step 608, the network node generates a handover message, wherein generating the handover message comprises including the first and second bearer IDs in the handover message. In step 610, the network node transmits the handover message.

Figure 7:
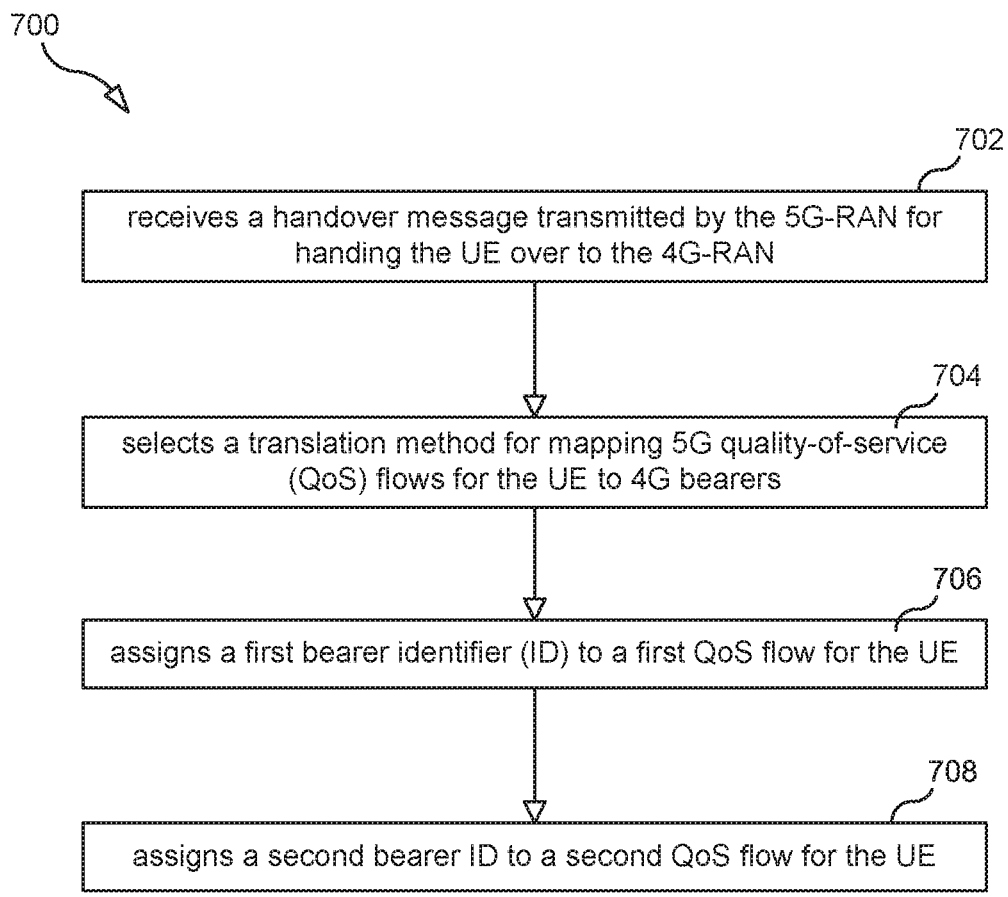
FIG. 7 is a flow chart illustrating a process according to some embodiments.

FIG. 7 is a flow chart illustrating a process 700 according to some embodiments. Process 700 may begin in step 702 in which UE 101 receives a handover message transmitted by the 5G-RAN for handing the UE over to the 4G-RAN. In step 704, UE 101 selects a translation method for mapping 5G quality-of-service (QoS) flows for the UE to 4G bearers. In step 706, UE 101 assigns a first bearer identifier (ID) to a first QoS flow for the UE. In step 708, UE 101 assigns a second bearer ID to a second QoS flow for the UE.

Figure 8:
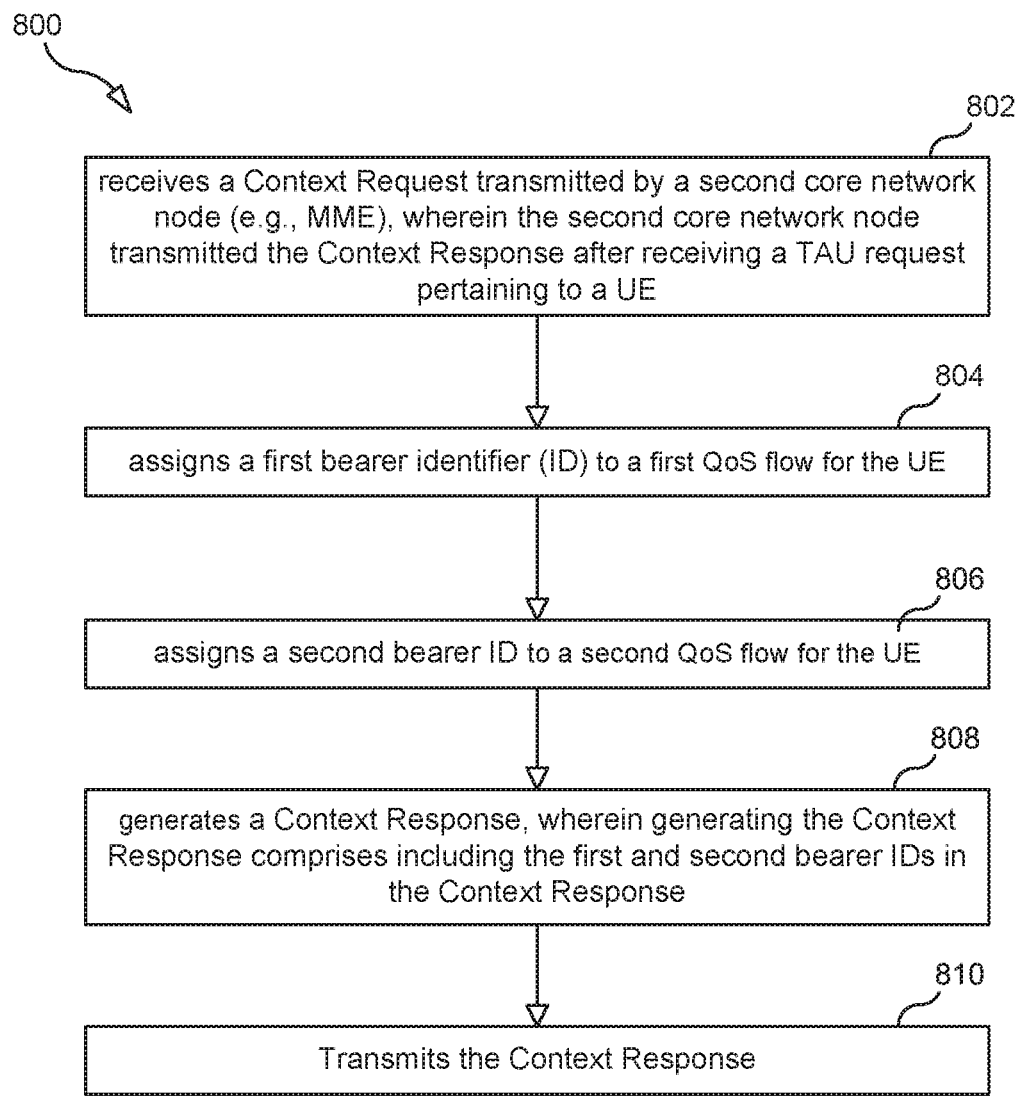
FIG. 8 is a flow chart illustrating a process according to some embodiments.

FIG. 8 is a flow chart illustrating a process 800 according to some embodiments. Process 800 may begin in step 802 in which 5G CN 104 receives a Context Request transmitted by a second core network node (e.g., MME), wherein the second core network node transmitted the Context Response after receiving a TAU request pertaining to a UE. In step 804, 5G CN 104 assigns a first bearer identifier (ID) to a first QoS flow for the UE. In step 806, 5G CN 104 assigns a second bearer ID to a second QoS flow for the UE. In step 808, 5G CN 104 generates a Context Response, wherein generating the Context Response comprises including the first and second bearer IDs in the Context Response. In step 810, 5G CN 104 transmits the Context Response.

Figure 9:
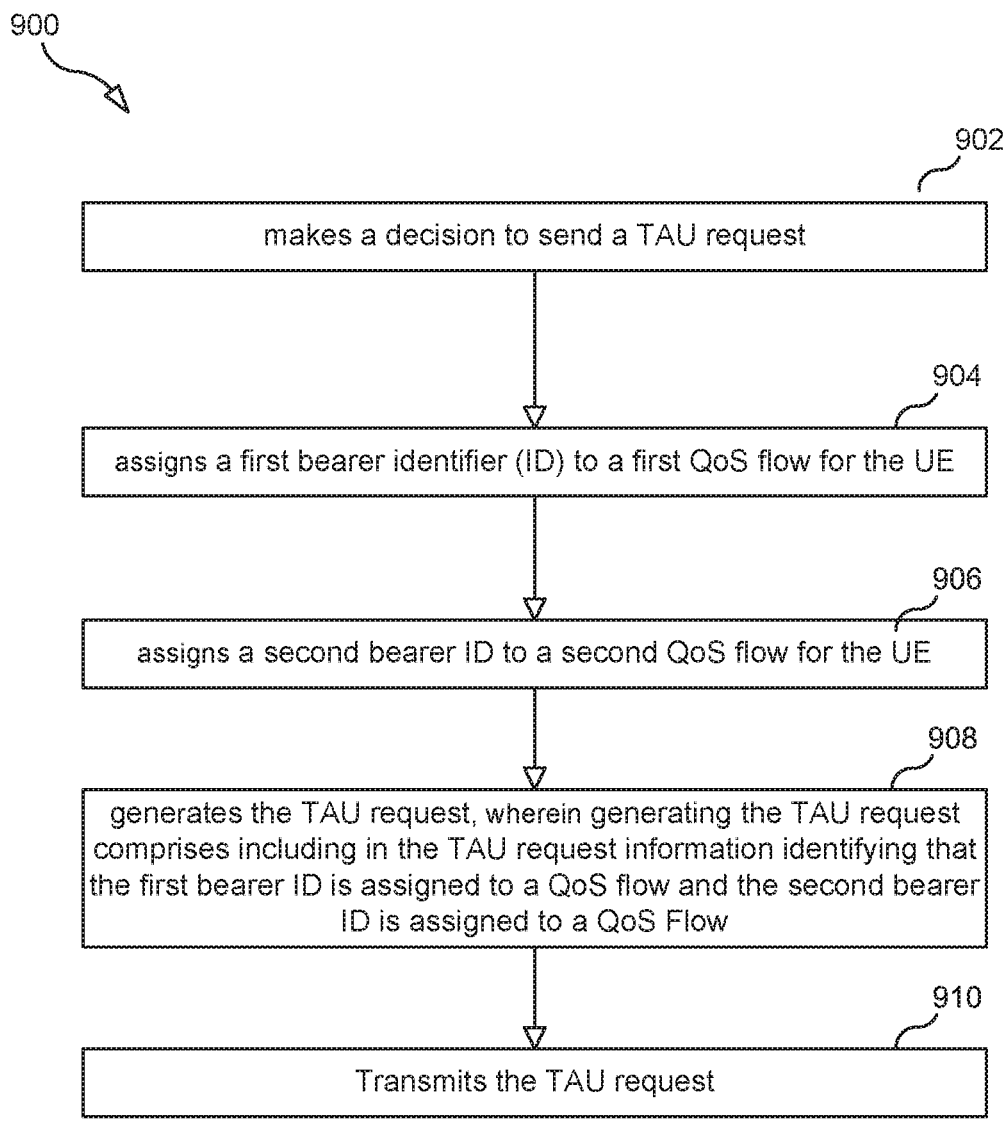
FIG. 9 is a flow chart illustrating a process according to some embodiments.

FIG. 9 is a flow chart illustrating a process 900 according to some embodiments. Process 900 may begin in step 902 in which UE 101 makes a decision to send a TAU request. In step 904, UE 101 assigns a first bearer identifier (ID) to a first QoS flow for the UE. In step 906, UE 101 assigns a second bearer ID to a second QoS flow for the UE. In step 908, UE 101 generates the TAU request, wherein generating the TAU request comprises including in the TAU request information identifying that the first bearer ID is assigned to a QoS flow and the second bearer ID is assigned to a QoS Flow. In step 910, UE 101 transmits the TAU request.

Figure 10:
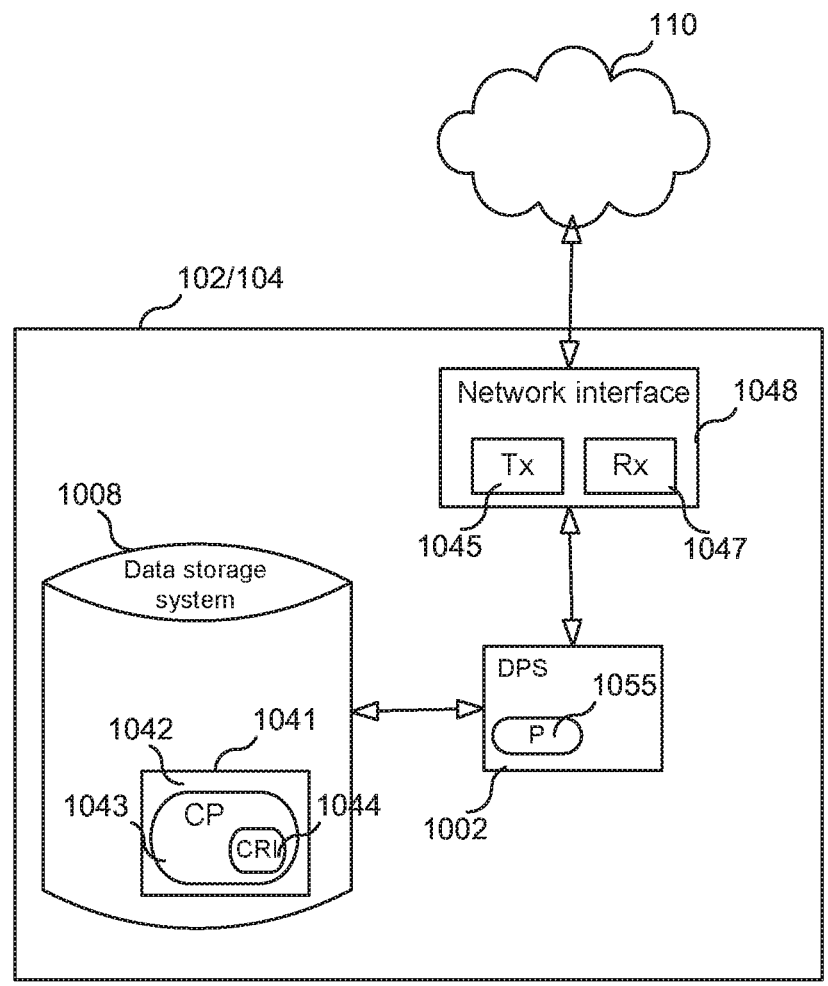
FIG. 10 is a block diagram of a network node according to some embodiments.

FIG. 10 is a block diagram of node 102/104 according to some embodiments. As shown in FIG. 10, network node 102/104 may comprise: a data processing system (DPS) 1002, which may include one or more processors (P) 1055 (e.g., a general purpose microprocessor and/or one or more other processors, such as an application specific integrated circuit (ASIC), field-programmable gate arrays (FPGAs), and the like): a network interface 1048 comprising a transmitter (Tx) 1045 and a receiver (Rx) 1047 for enabling network node 102/104 to transmit data to and receive data from other nodes connected to a network 110 (e.g., an Internet Protocol (IP) network) to which network interface 1048 is connected; and local storage unit (a.k.a., "data storage system") 1008, which may include one or more non-volatile storage devices and/or one or more volatile storage devices (e.g., random access memory (RAM)). In embodiments where network node 102/104 includes a general purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media (e.g., a DVD), memory devices (e.g., random access memory), and the like. In some embodiments, the CRI 1044 of computer program 1043 is configured such that when executed by data processing system 1002, the CRI causes network node 102/104 to perform steps described above (e.g., steps described above with reference to the flow charts). In other embodiments, network node 102/104 may be configured to perform steps described herein without the need for code. That is, for example, data processing system 1002 may consist merely of one or more ASICs. Hence, the features of the embodiments described herein may be implemented in hardware and/or software.

Figure 11:
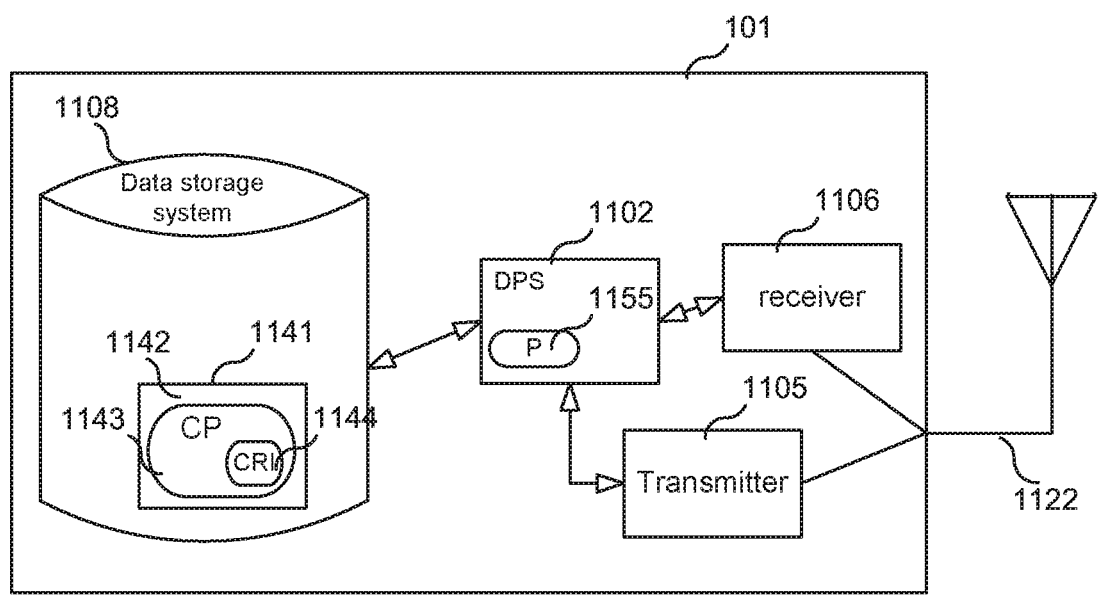
FIG. 11 is a block diagram of a UE according to some embodiments.

FIG. 11 is a block diagram of a UE 101 according to some embodiments. As shown in FIG. 11, UE 101 may comprise: a data processing system (DPS) 1102, which may include one or more processors 1155 (e.g., a general purpose microprocessor and/or one or more other processors, such as an application specific integrated circuit (ASIC), field-programmable gate arrays (FPGAs), and the like); a transmitter 1105 and a receiver 1106 coupled to an antenna 1122 for use in wirelessly communicating with a radio access network (RAN) node (e.g., a TRP); and local storage unit (a.k.a., "data storage system") 1112, which may include one or more non-volatile storage devices and/or one or more volatile storage devices (e.g., random access memory (RAM)). In embodiments where UE 101 includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media (e.g., a DVD), memory devices (e.g., random access memory), and the like. In some embodiments, the CRI 1144 of computer program 1143 is configured such that when executed by data processing system 1102, the CRI causes UE 101 to perform steps described above (e.g., steps described above with reference to the flow charts). In other embodiments, UE 101 may be configured to perform steps described herein without the need for code. That is, for example, data processing system 1102 may consist merely of one or more ASICs. Hence, the features of the embodiments described herein may be implemented in hardware and/or software.

Figure 12A:
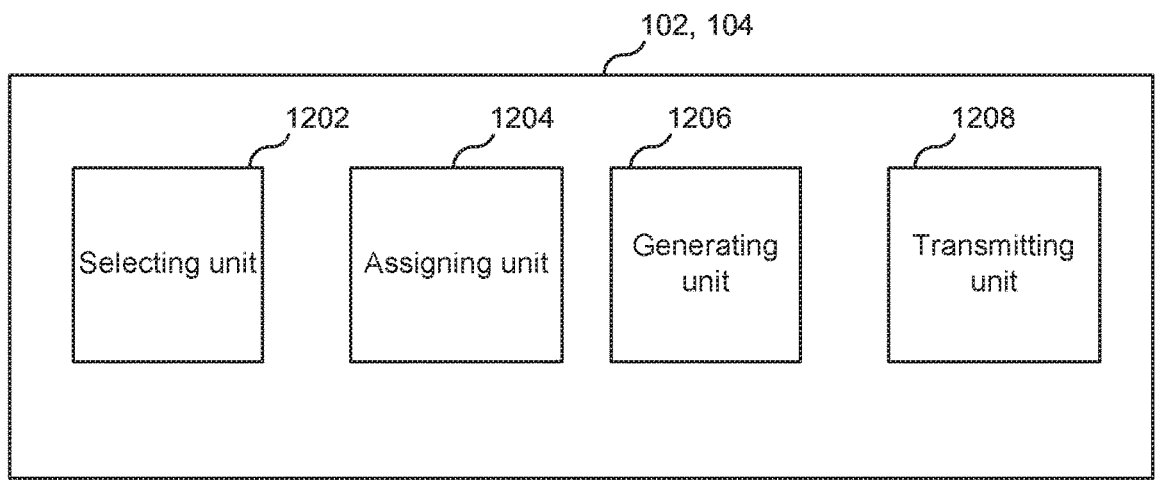
FIG. 12A is a diagram showing functional units of a network node according to some embodiments.

FIG. 12A is a diagram showing functional units of a network node (e.g., network node 102 or network node 104) according to some embodiments. The node includes: a selecting unit 1202 configured to select a translation method for mapping 5G QoS flows for UE 101 to 4G bearers; an assigning unit 1204 configured to assign a first bearer ID to a first QoS flow for the UE and assign a second bearer ID to a second QoS flow for the UE; a generating unit 1206 configured to generate a handover message: and a transmitting unit 1208 configured to employ a transmitter to transmit the handover message. The generating unit 1206 is adapted to generate the handover message by performing a process comprising including the first and second bearer IDs in the handover message.

Figure 12B:
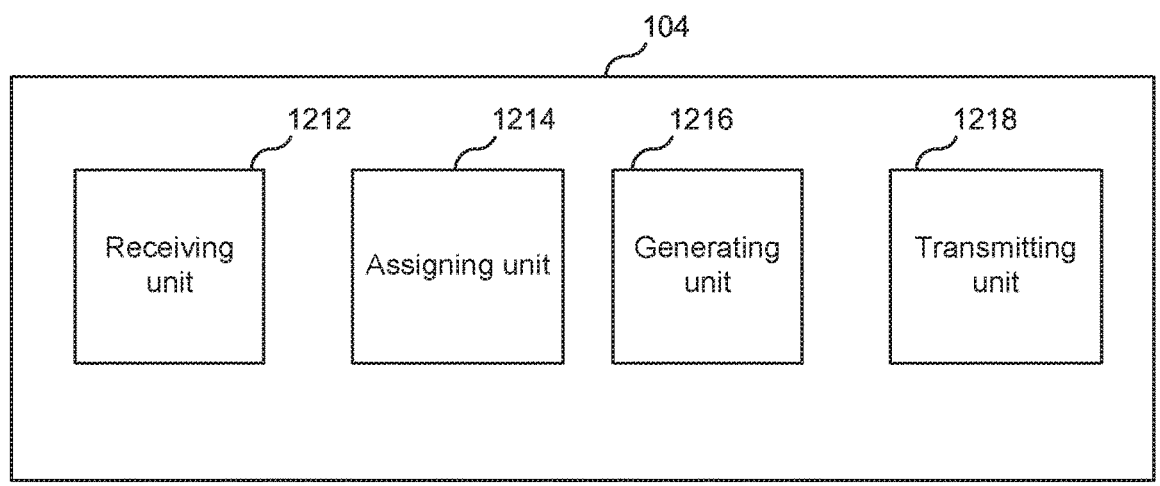
FIG. 12B is a diagram showing functional units of a network node according to some embodiments.

FIG. 12B is a diagram showing functional units of network node 104 according to some embodiments. As shown in FIG. 12B, network node 104 includes a receiving unit 1212 adapted to receive a Context Request transmitted by a second core network node (e.g., network node 105), wherein the second core network node transmitted the Context Response after receiving a TAU request pertaining to a UE (e.g., UE 101); an assigning unit 1214 configured to assign a first bearer ID to a first QoS flow for the UE and assign a second bearer ID to a second QoS flow for the UE; a generating unit 1216 configured to generate a Context Response; and a transmitting unit 1218 configured to employ a transmitter to transmit the Context Response, wherein the generating unit 1216 is adapted to generate the Context Response by performing a process comprising including the first and second bearer IDs in the Context Response.

Figure 13A:
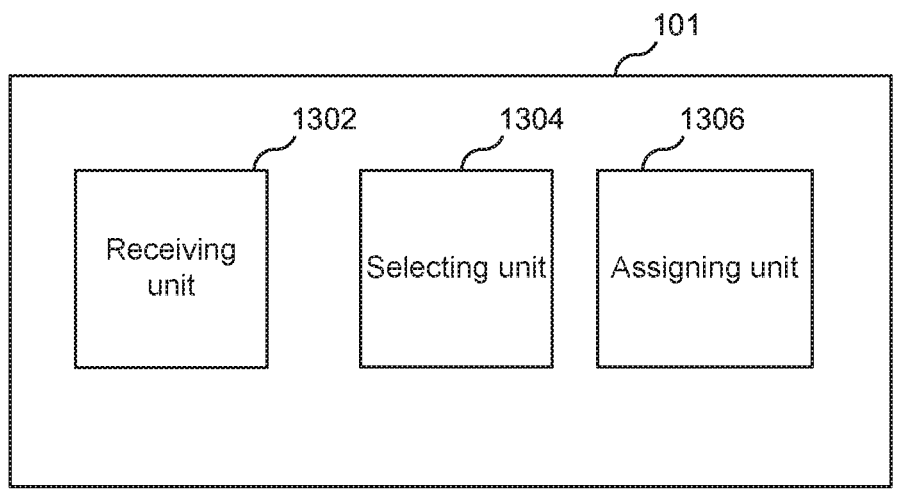
FIG. 13A is a diagram showing functional units of a UE according to some embodiments.

FIG. 13A is a diagram showing functional units of a UE (e.g., UE 101) according to some embodiments. As shown in FIG. 13A, the UE includes a receiving unit 1302 configured to employ a receiver to receive a handover message transmitted by a 5G-RAN 102 for handing the UE over to a 4G-RAN 103; a selecting unit 1304 configured to select a translation method for mapping 5G QoS flows for the UE to 4G bearers; and an assigning unit 1306 configured to assign a first bearer ID to a first QoS flow for the UE assign a second bearer ID to a second QoS flow for the UE.

Figure 13B:
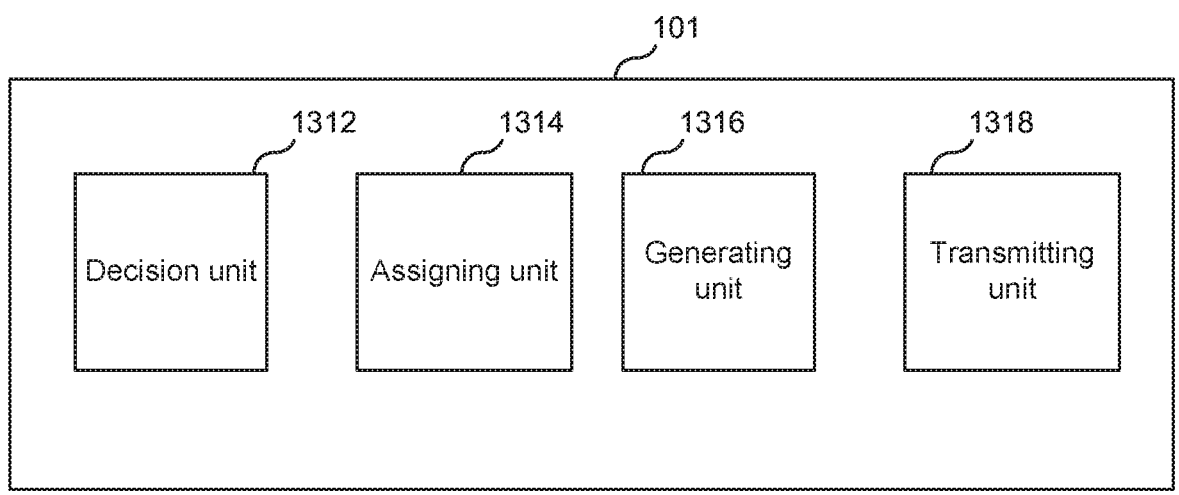
FIG. 13B is a diagram showing functional units of a UE according to some embodiments.

FIG. 13B is a diagram showing functional units of a UE (e.g., UE 101) according to some embodiments. As shown in FIG. 13A, the UE includes a decision unit 1312 that is operable to make a decision to send a TAU request; an assigning unit 1314 configured to assign a first bearer ID to a first QoS flow for the UE and assign a second bearer ID to a second QoS flow for the UE; a generating unit 1316 configured to generate the TAU request; and a transmitting unit 1318 configured to employ a transmitter to transmit the TAU request, wherein the generating unit 1316 is configured to generate the TAU request by performing a process comprising including in the TAU request information identifying that the first bearer ID is assigned to a QoS flow and the second bearer ID is assigned to a QoS Flow.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for handover from a 5G radio access network (5G RAN) to a 4G-RAN, the method comprising:
    assigning a first bearer identifier, ID, to at least a first QoS flow for the UE;
    assigning a second bearer ID to at least a second QoS flow for the UE;
    generating a handover message; and
    transmitting the handover message, wherein
    generating the handover message comprises including the first and second bearer IDs in the handover message.

2. The method of claim 1, further comprising selecting a translation method for mapping 5G quality-of-service (QoS) flows for a user equipment, UE, to 4G bearers.

3. The method of claim 2, wherein selecting the translation method comprises selecting a translation method that matches a translation method selected by a 5G core network node (CN).

4. The method of claim 3, wherein selecting a translation method that matches a translation method selected by the 5G CN comprises determining the translation method selected by the 5G CN by receiving from the 5G CN a message identifying the translation method selected by the 5G CN.

5. The method of claim 1, wherein the method is performed by the 5G-RAN.

6. The method of claim 1, wherein
    generating the handover message comprises generating a transparent container for the 4G-RAN, and
    the first and second bearer IDs are E-RAB IDs that are included in an E-RABs Information Lists Information Element (IE) of the transparent container.

7. The method of claim 6, wherein the handover message further comprises:
    the first bearer ID and at least a first QoS flow ID that identifies the first QoS flow to which the first bearer ID is assigned, and
    the second bearer ID and at least a second QoS flow ID that identifies the second QoS flow to which the second bearer ID is assigned.

8. The method of claim 1, wherein
the first QoS flow is a default QoS flow, and
the second QoS flow is a guaranteed bit rate, GBR, QoS flow.

9. The method of claim 1, wherein
the method further comprises creating an ordered set of guaranteed bit rate, GBR, QoS flows prior to performing the assigning steps, wherein the ordered set of GBR QoS flows comprises a first GBR QoS flow being the first GBR QoS flow in the ordered set and a second GBR QoS flow being the second GBR QoS flow in the ordered set,
the first QoS flow is a default QoS flow, and
the second QoS flow is the first GBR QoS flow.

10. A network node, the network node comprising: a local storage unit and a data processing system comprising a processor, the data processing system being coupled to the local storage unit, wherein the network node is configured to perform the method of claim 1.

11. A method performed by a user equipment, UE, capable of communicating with a 5G-RAN and a 4G-RAN, the method comprising:
the UE assigning a first bearer identifier, ID, to a first QoS flow for the UE; and
the UE assigning a second bearer ID to a second QoS flow for the UE.

12. The method of claim 11, further comprising the UE selecting a translation method for mapping 5G quality-of-service (QoS) flows for the UE to 4G bearers.

13. The method of claim 12, wherein selecting the translation method comprises selecting a translation method to match a translation method selected by a 5G core network node, CN.

14. The method of claim 13, wherein selecting a translation method that matches a translation method selected by the 5G CN comprises determining the translation method selected by the 5G CN by receiving from the 5G CN a message identifying the translation method selected by the 5G CN.

15. The method of claim 11, further comprising the UE transmitting a registration request message comprising information identifying a set of one or more translation methods for mapping 5G QoS flows to 4G bearers that are supported by the UE.

16. The method of claim 15, wherein the registration request message is one of: i) a Non-Access Stratum (NAS) Registration Request and ii) a NAS Tracking Area Update (TAU) Request.

17. A user equipment, UE, the UE comprising: a local storage unit and a data processing system comprising a processor, the data processing system being coupled to the local storage unit, wherein the UE is configured to perform the method of claim 11.

18. A tracking area update (TAU) method, wherein the method is performed by a first core network node, CN, the method comprising:
receiving a Context Request transmitted by a second core network node, wherein the second core network node transmitted the Context Response after receiving a TAU request pertaining to a UE;
assigning a first bearer identifier, ID, to a first QoS flow for the UE;
assigning a second bearer ID to a second QoS flow for the UE;
generating a Context Response; and
transmitting the Context Response, wherein
generating the Context Response comprises including the first and second bearer IDs in the Context Response.

19. A first core network node (CN), the CN comprising: a local storage unit and a data processing system comprising a processor, the data processing system being coupled to the local storage unit, wherein the CN is configured to perform the method of claim 18.

20. A tracking area update (TAU) method, wherein the method is performed by a user equipment, UE, the method comprising:
making a decision to send a TAU request;
assigning a first bearer identifier, ID, to a first QoS flow for the UE;
assigning a second bearer ID to a second QoS flow for the UE;
generating the TAU request; and
transmitting the TAU request, wherein
generating the TAU request comprises including in the TAU request information identifying that the first bearer ID is assigned to a QoS flow and the second bearer ID is assigned to a QoS Flow.

21. The method of claim 20, wherein including in the TAU request information identifying that the first bearer ID is assigned to a QoS flow and the second bearer ID is assigned to a QoS Flow comprises including in the TAU request an EPS bearer context status IE that indicates that the bearers corresponding to the first and second bearer IDs are not inactive.

22. A user equipment, UE, the UE comprising: a local storage unit and a data processing system comprising a processor, the data processing system being coupled to the local storage unit, wherein the UE is configured to perform the method of claim 20.

23. A method for mapping quality of service (QoS) flows to bearer identifiers, the method comprising:
receiving, at a 5G core network node, 5G-CN, a session establishment request; and
after receiving the session establishment request, the 5G-CN transmitting to a 5G radio access network, 5G-RAN, a session request, wherein
the session request comprises i) information identifying a set of QoS flows and ii) subject for handover information indicating which of the identified QoS flows are subject for handover.

24. The method of claim 23, wherein the session request comprises a QoS profile, and the subject for handover information is part of the QoS profile.

* * * * *